Jan. 5, 1926.  W. E. DERWENT  1,568,952
COOKING CHART
Filed Sept. 5, 1925
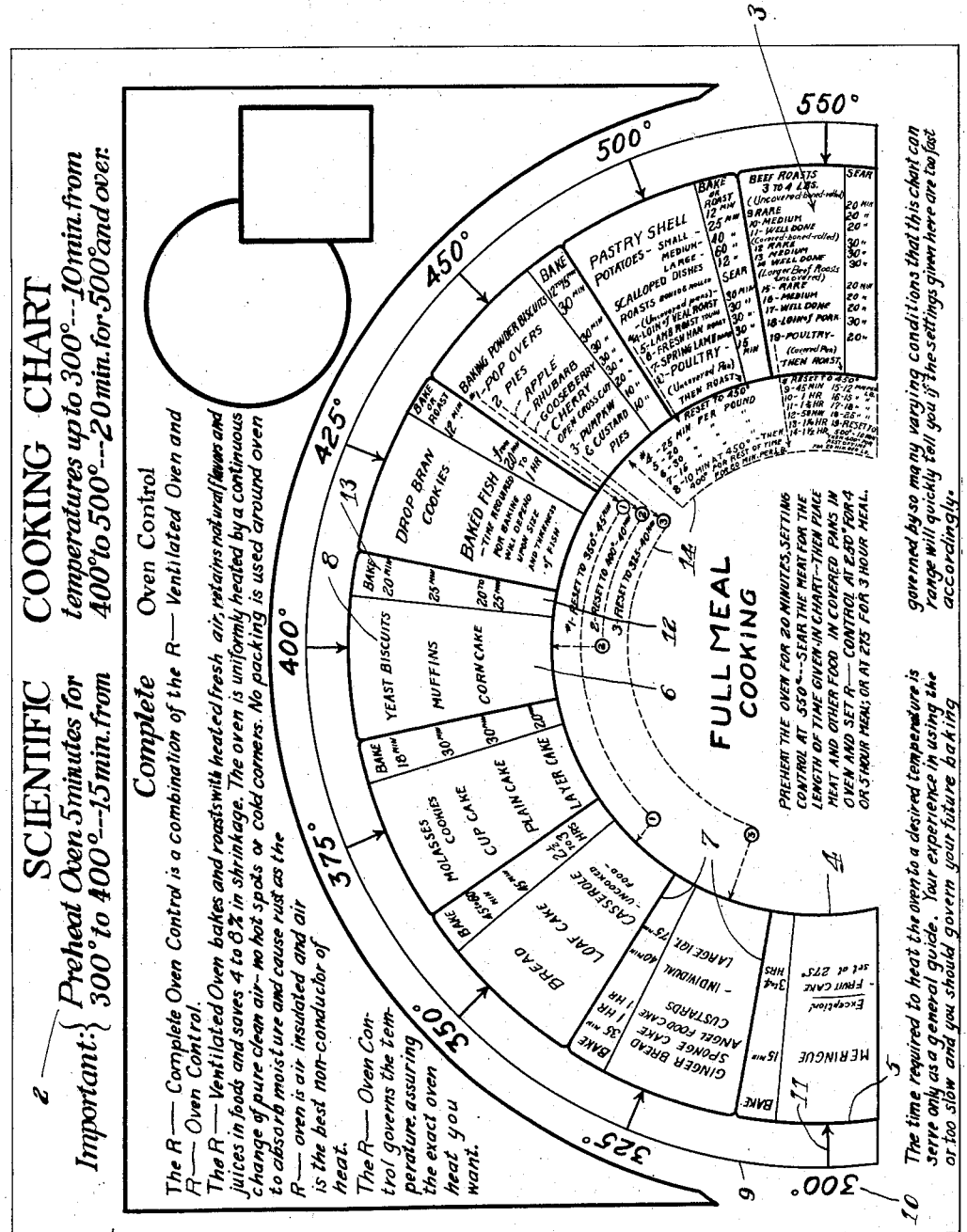

Patented Jan. 5, 1926.

1,568,952

UNITED STATES PATENT OFFICE.

WATSON E. DERWENT, OF ROCKFORD, ILLINOIS, ASSIGNOR TO GEO. D. ROPER CORPORATION, OF ROCKFORD, ILLINOIS, A CORPORATION OF ILLINOIS.

COOKING CHART.

Application filed September 5, 1925. Serial No. 54,635.

*To all whom it may concern:*

Be it known that I, WATSON E. DERWENT, a citizen of the United States, residing at Rockford, in the county of Winnebago and State of Illinois, have invented certain new and useful Improvements in Cooking Charts, of which the following is a specification.

This invention relates to cooking charts generally, and more particularly to a scientific chart or guide to serve as a reference in baking with a gas or electric stove, to determine the proper oven temperature to be maintained and the length of time required for wholesome preparation of any food desired.

The principal object is to provide a chart of this kind having the information compiled in a novel and especially advantageous manner to avoid confusion and ambiguity, and to make the location of any desired food preparation easy to find and the instructions with regard thereto definite and easy to understand.

The invention provides a cooking chart consisting of a table of foods arranged preferably in an arc and divided radially into sections, each of which has a list of foods capable of preparation at a certain oven temperature and, having in connection therewith a list of the time periods the different foods must be left in the oven, there being provision also for stepping over from one oven temperature to another in the case of foods which require one oven temperature for one period and then another oven temperature for another period.

As a result of the foregoing provisions there is eliminated in baking the usual element of chance and a great deal of guess work, and the experience of skilled food specialists recommending the different periods of time for the preparation of different foods set forth in the chart is made available to the housewife in such a way that with no great amount of experience, tolerably good results can be secured.

The accompanying drawing illustrates the chart of my invention.

The chart of the present invention is provided in the form of a decalcomania transfer burned in the enamel, preferably on the inside of the oven door, but may be provided in any other manner suitable for household kitchen use. For example, the chart may be printed on a card 1 and furnished to the purchaser of a gas stove. The chart may contain any general information relative to the operation and control of the stove as, for example, that indicated at 2 having reference to the necessity for pre-heating the oven for different periods of time where the oven is to be operated at different temperatures in the preparation of different foods. So far as the present invention is particularly concerned, the general information may partake of a variety of forms. The principal feature of the chart is the provision of a table of foods indicated at 3. This table is defined by concentric arcs 4 and 5 having radial sections 6 defined by regularly spaced radial lines 7. Each of the sections 6 bears a list or column of foods 8 as indicated. All of the foods in a column are capable of preparation at a given oven temperature. Arranged in regularly spaced relation in an arc about the arc 9, which is concentric with the arcs 4 and 5, are temperatures 10 with radially extending arrows 11 referring to the different sections 6 of the table. The sections 6 are subdivided radially into auxiliary sections 12 having columns 13 of time periods. The time periods refer to the length of time a food must be kept in the oven at whatever temperature is prescribed therefor. The periods are arranged as shown adjacent the particular foods to which they pertain. From the description thus far, it will be apparent that as we observe the chart table each section is distinctly set off from the other sections due to the arcuate form of the table and the fact that the sections extend radially. It is, therefore, quite easy to concentrate on any section of the table and derive therefrom, such information as is required for the preparation of any food under consideration. Once the food in question is located in its proper column the oven temperature prescribed therefor is at once apparent since the oven temperature heads the column. The only other remaining information required is the length of time the preparation is to remain in the oven. This information occurs directly adjacent the food selected.

The information secured in the above manner is sufficient for the preparation of the majority of foods. However, in some cases as, for example, in the case of pies and baking powder biscuits, it is necessary to bake at one temperature for a certain length of time and then step down to a lower temperature for another stated time, or in the case of roats, it is necessary to sear the meat at an extreme temperature for a certain length of time and then reset to a lower temperature for the balance of the time. For this purpose the chart is provided with lead lines 14 extending radially inwardly from the different foods in a column of one section of the table and then in an arc over to another section of the table as indicated. The information with regard to the change in oven temperature is conveniently printed on or above the lead lines as shown. Where a variety of foods occurs in a single column in a section and the different foods require a stepping down in the temperature to different degrees, it will be noted that the different foods are given different numerals, and these numerals in turn are used in connection with the information over the lead lines in order properly to link up the information with the different foods and avoid confusion.

From the foregoing description, it will be noted that I have provided a cooking chart of a unique form capable of intelligent use by any housewife practically regardless of the extent of experience. All of the information contained in the chart, having been compiled by expert food specialists and proven by experiment so as to be scientifically correct, is available in a very easily understood form and the element of chance and guess work and considerable worry is eliminated in the use of the chart.

I claim:

1. In a cooking chart, a table of foods arranged in an arc and divided radially into sections, each section having an assigned temperature referring to that to be maintained in an oven, and lists of foods in the separate sections arranged in radial columns, all of the foods in a section being capable of preparation in an oven at the same temperature.

2. In a cooking chart, a table of foods arranged in an arc and divided radially into sections, each section having an assigned temperature referring to that to be maintained in an oven, and lists of foods in the separate sections arranged in radial columns, all of the foods in a section being capable of preparation in an oven at the same temperature, but not necessarly in the same length of time, and a list of the periods of time required for the foods in each section arranged radially alongside the lists of foods with each time period adjacent the food to which it pertains.

3. In a cooking chart, a table of foods arranged in an arc and divided radially into sections, each section having an assigned temperature referring to that to be maintained in an oven, lists of foods in the separate sections arranged in radial columns, all of the foods in a section being capable of preparation in an oven at the same temperature but not necessarily in the same length of time, and a list of the periods of time required for the foods in each section arranged radially alongside the lists of foods with each time period adjacent the food to which it pertains, and provisions on said chart for stepping over from one section under one temperature to another section with another temperature in the case of foods baked for a time at one temperature and for a time at another temperature.

4. In a cooking chart, a table of foods arranged to be read crosswise and divided into sections side by side, each section having an assigned temperature referring to that to be maintained in an oven, and lists of foods in the separate sections, all of the foods in a section being capable of preparation in an oven at the same temperature but not necessarily in the same length of time, and a list of the periods of time required for the foods in each section arranged side by side with the lists of foods, with each time period adjacent the food to which it pertains.

5. In a cooking chart, a table of foods arranged to be read crosswise and divided into sections side by side, each section having an assigned temperature referring to that to be maintained in an oven, and lists of foods in the separate sections, all of the foods in a section being capable of preparation in an oven at the same temperature but not necessarily in the same length of time, a list of the periods of time required for the foods in each section arranged side by side with the lists of foods, with each time period adjacent the food to which it pertains, and lead lines extending from one section with one assigned temperature to another section with another assigned temperature, and having information printed adjacent thereto, with regard to resetting from the one oven temperature to the other for a food in the list of foods in the first named section.

In witness of the foregoing I affix my signature.

WATSON E. DERWENT.